July 16, 1957 S. R. BOLIN, JR 2,799,088
TRACING TABLE ATTACHMENT
Filed Oct. 6, 1953 3 Sheets-Sheet 1

INVENTOR.
Stuart R. Bolin, Jr.
BY
ATTORNEYS

INVENTOR.
Stuart R. Bolin, Jr.
BY
Cabett, Mahney & Miller
ATTORNEYS

July 16, 1957     S. R. BOLIN, JR     2,799,088
TRACING TABLE ATTACHMENT

Filed Oct. 6, 1953     3 Sheets-Sheet 3

INVENTOR.
Stuart R. Bolin, Jr.
BY
ATTORNEYS ically, with the 2,799,088
Patented July 16, 1957

2,799,088

TRACING TABLE ATTACHMENT

Stuart R. Bolin, Jr., Columbus, Ohio

Application October 6, 1953, Serial No. 384,413

5 Claims. (Cl. 33—20)

My invention relates to a tracing table attachment. It has to do, more particularly, with an attachment for use on a tracing table that is a unit of a stereo-plotting device that is used in making three-dimensional maps from aerial photographs. It is adaptable to various standard tracing tables, such as those used on the Bausch & Lomb Multiplex, the Kelsh Plotter, and other standard stereo-plotting machines.

The science of aerial photography uses aerial photographs for the production of highly accurate maps, charts and large scale surveys. In making the maps from these photographs, stereo-plotting devices of the Bausch & Lomb Multiplex type, the Kelsh Plotter type, and other standard stereo-plotting machines are used. These stereo-plotting machines each include a tracing table which is moved over the drawing paper to produce a map from the aerial photograph. During the making of the map it is necessary that the image platen of the tracing table be adjusted vertically in accordance with the contour elevations shown by the image from the aerial photograph. Most of the standard tracing tables are of foreign make and the meter which registers the elevations, in accordance with the elevation of the image platen, registers in the metric system. However, since engineers in the United States commonly use the English system of feet and tenths of feet, it is necessary to convert the meter readings of the plotting table into feet, tenths, etc. Or when actual measurements have been obtained for use with the plotting machine, it is necessary to convert these English system measurements into the metric system for use with the plotting table that has its meter calibrated in accordance with the metric system. Each of these conversions carries with it the possibilities of human error through transposition or other general mathematical miscalculations. Further still, the high cost of time consumed by engineers in making these conversions and the continuous need to refer to conversion tables is a major factor in the cost of the completed project.

The object of my invention is to provide an attachment which can be applied easily and quickly to the tracing table of standard stereo-plotting devices which are equipped with meters that register the measurements produced by the table according to the metric system so that the plotting table will produce measurements and the meter will register according to the English system and which can be removed easily and quickly to permit restoration of the tracing table to its original condition when the table will again produce metric measurements and the meter will read in the metric system.

Another object of my invention is to provide an attachment of the type indicated wherein the production scale of the tracing table may be easily and quickly varied.

Still another object of my invention is to provide an attachment which is simple and inexpensive and can be applied readily to standard tracing tables without changes in such tables.

In the accompanying drawings, I have illustrated my invention applied to the tracing table of one type of stereo-plotting machine. In these drawings.

Figure 9:
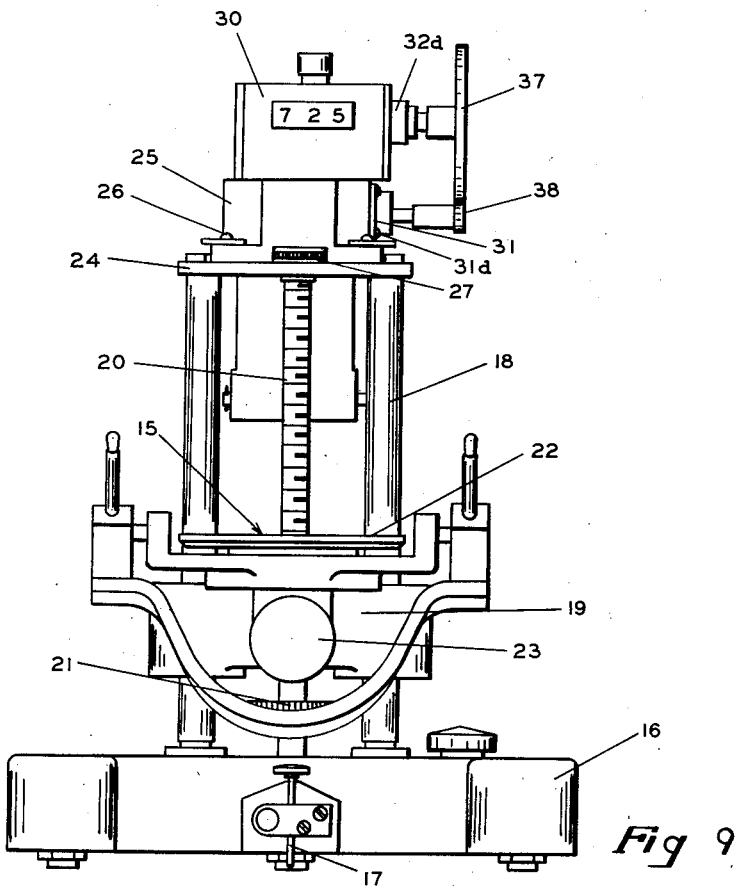
Figure 9 is a schematic view showing the tracing table with my attachment thereon.

With reference to the drawings, in Figure 9, I have illustrated schematically the tracing table 15 of a stereo-plotting device which is of the type known as the Kelsh Plotter. My invention is applicable to this type of device, but it is to be understood that it is also applicable to other standard plotting devices.

The table 15 of this type of plotting device includes the base 16 which is mounted on plastic, onyx or glass feet for movement over the tracing paper and which carries the tracing point 17. On the base 16 is the standard 18 (Figure 9) and mounted for vertical movement on this standard is a carriage 19 which is moved vertically on the standard by means of a screw 20. This screw 20 is rotated by means of a knurled knob 21. The carriage 19 carries the usual image platen 22 which has a central lighted dot in the form of a small opening (not shown) which is axially aligned with the tracing point 17 and which receives light from a housing 23 carried by the carriage 19.

Figures 10, 11:
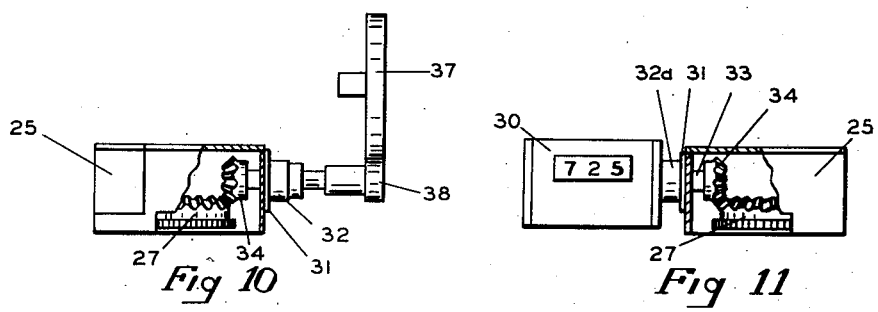
Figure 10 is an elevational view, partly broken away, illustrating the meter-driving mechanism with my attachment in place.
Figure 11 is a similar view, but showing the meter-driving mechanism when my attachment is not on the table.

On top of the standard 18 is supported a plate 24 (Figures 7 and 9) in which the upper end of the screw 20 is rotatably mounted and to which the gear housing 25 is attached by the four case screws 26. As shown in Figures 10 and 11, this gear housing encloses a ring gear 27 which has teeth formed on its upper edge. This gear 27 is carried on the upper end of the screw 20 so that when the screw is rotated to adjust the level of platen 22, the gear 27 is also rotated. The screw 20 is connected to the gear 27 by a slip clutch 28 of the friction type. By means of the knurled flange 27, which extends through a slot in the housing 25, the gear 27 may be rotated relative to the screw 20. This is the usual arrangement provided for the purpose of initially setting or adjusting the meter 30, which is associated with the housing 25.

Figure 8:
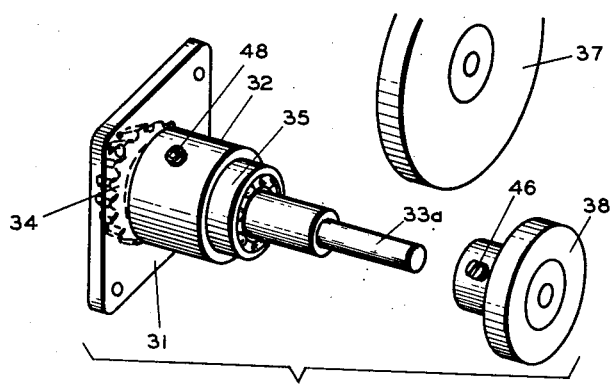
Figure 8 is a perspective view of the meter-driving shaft showing a driving disc or gear of one size to be mounted thereon and showing the driven gear or disc which is associated therewith, and which is to be mounted on the meter shaft.

In this type of standard device, the meter 30 normally registers and records according to the metric system. As shown in Figure 11, without my attachment, the meter 30 is mounted directly on the housing 25. The housing carries a flat plate 31 which fits over an opening in the wall thereof and is fastened thereto by case screws 31a (Figure 9). This plate 31 carries an outwardly projecting socket sleeve 32 (Figure 8). Normally, with the meter 30 in place, as in Figure 11, the meter shaft 33 projects inwardly through this sleeve. The meter 30 is provided with a projecting sleeve 32a which surrounds the meter shaft 33, and this sleeve slips into the socket sleeve 32. The meter shaft 33 is driven by means of a pinion 34 (Figure 11) keyed on its inner end and which meshes with the ring gear 27.

Figure 7:
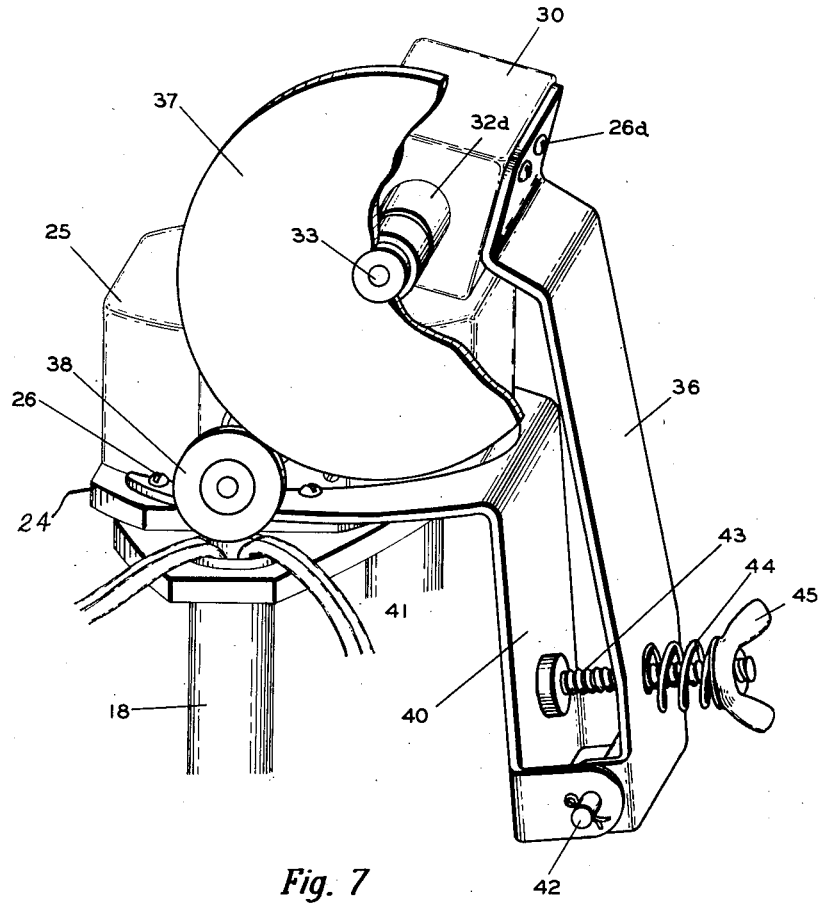
Figure 7 is a perspective view showing the attachment mounted on the upper part of the tracing table.

In mounting my attachment, to obtain meter readings in feet, the shaft 33 with the pinion 34 thereon is pulled outwardly through the sleeve 32 by pulling the meter 30 outwardly to slip sleeve 32a from sleeve 32. The pinion 34 is then removed from the shaft 33 and the pinion is then nonrotatably mounted on the inner end of a meter-driving shaft 33a which is substituted for shaft 33. However, before this substitution the gear housing 25 is removed, rotated through 180°, and is then replaced using the same case screws 26 (Figures 7, 9, 10). The socket sleeve 32 will then project to the right, as shown in Figure 10, rather than to the left, as shown in Figure 11. Before the shaft 33a is inserted through the sleeve 32 to cause the pinion 34 to again mesh with the ring gear 27, ball bearings 35 are mounted on the shaft 33a, and will bear in the sleeve 32. The shaft 33a will project a considerable distance from the sleeve 32, as shown in Figure 8. The meter 30 is now removably attached to the upper end of a bracket 36 by screws 26a, as shown in Figures 7, 9 and 10, that is supported in a manner to be described later. On the outer end of the shaft 33, in place of the previously removed pinion 34, there is keyed a driven disc or gear 37. This disc or gear 37 meshes or engages with a driven disc or gear 38 which is now keyed on the outer end of the shaft 33a. The bracket 36 will support the meter 30 with the disc or gear 37 in the same plane as the disc or gear 38, so that they will properly engage each other in driving relationship.

The bracket 36 is resiliently supported by the depending portion of a fixed inverted L-shape bracket 40 which has an attaching yoke 41 on its upper end, as shown in Figures 1, 2, 3, 4 and 7. The yoke 41 is provided with four holes 26b (Figure 1) so that it can be attached to the table 15 between the housing 25 and the plate 24 (Figure 7) by the same case screws 26 which hold the housing in place thereon. The lower end of the bracket 36 is pivoted to the lower end of the bracket 40 by a pivot pin 42 (Figures 1 to 4 and 7). A bolt 43 is anchored to bracket 40 and extends loosely outwardly through an opening in the bracket 36. A compression spring 44 engages the outer face of bracket 36 and the wing nut 45 on the outer end of bolt 43. Thus, the spring 44 tends to swing the bracket 36 inwardly about the pivot 42. This will keep the discs or gears 37 and 38 in driving engagement. The pressure of engagement may be adjusted by adjusting the nut 45.

Figure 1:
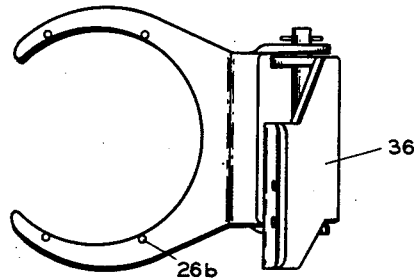
Figure 1 is a plan view of a mounting bracket of my attachment.
Figure 2:
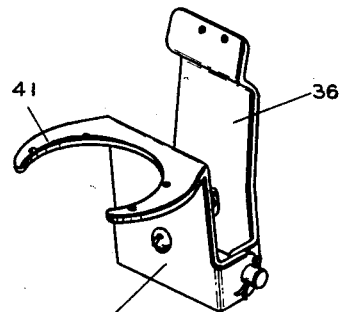
Figure 2 is a perspective view of the bracket.
Figure 3:
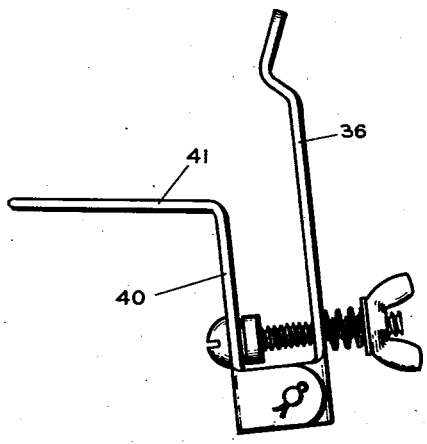
Figure 3 is an edge view of the bracket.
Figure 4:
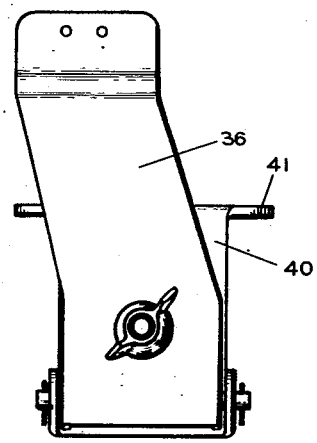
Figure 4 is an elevational view of the outer side of the bracket.
Figure 5:
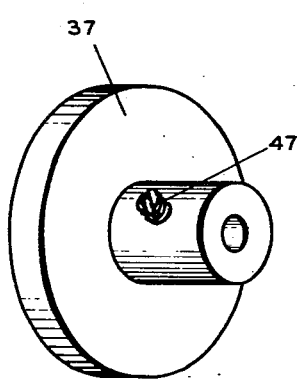
Figure 5 is a perspective view of the driven disc or gear which is to be mounted on the meter shaft.
Figure 6:
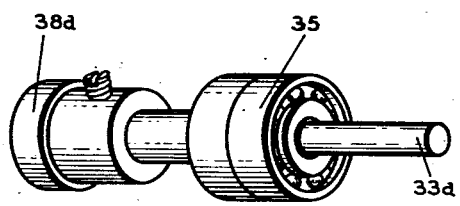
Figure 6 is a perspective view of the meter-driving shaft showing a driving disc or gear of one size carried thereby.

The members 37 and 38 may be discs, preferably of plastic, and the frictional contact therebetween may be relied upon to operate the meter 30 or they may be actual meshing gears. In either case, they will be readily slipped on and off their respective shafts 33 and 33a and, when on, will be held in place by set screws as the set screw 46, shown in Figure 8 on the gear 38 and the set screw 47 on gear 37 in Figure 5. Also bearings 35 will be held in sleeve 32 by set screw 48. The relative sizes of the gears or discs 37 and 38 will be such that when the image platen 22 is moved vertically, the screw 20 will drive the discs or gears 37 and 38, through the ring gear 27 and pinion 34, to such an extent that the meter 30 will register in feet instead of meters. To change the scale between the movement of the image platen 22 and the registering of the meter 30, it is merely necessary to substitute other discs or gears for either or both of the members 37 and 38. For example, in Figure 6, a smaller driving disc or gear 38a is shown on the shaft 33a while the member 38 in Figure 8 is larger. This substitution for members 37 and 38 can be made by slipping these members off their respective shafts and replacing with other members. The use of different diameter members will be permitted since the bracket 36 can be swung relative to bracket 40 and proper driving relationship between these members can be obtained. Instead of slipping the clutch 28 to adjust the meter 30, the members 37 and 38 can be spread apart and then the member 37 can be rotated to set the meter properly.

To restore the plotting table to its original condition shown in Figure 11, it is merely necessary to remove the housing 25, remove the brackets 36 and 40, remove the meter 30 from the bracket 36, replace the housing 30 in its original position, remove the shaft 33a, and remove the pinion 34 therefrom, replace this pinion on shaft 33 instead of member 37, and then insert shaft 33 into sleeve 32 with pinion 34 in engagement with ring gear 27 and position the sleeve 32a of meter 30 in the sleeve 32. The table 15 will now again produce measurements which will be registered in meters by meter 80.

It will be apparent from the above that with my attachment, the table may be quickly converted from a device which produces and registers measurements according to the metric system to a device which produces and registers measurements according to the English system. The scale of production can be changed easily and quickly. Furthermore, the device can be returned readily to its original condition. All of this is accomplished with a simple, inexpensive attachment which fits standard tracing tables.

Having thus described my invention, what I claim is:

1. In combination with a tracing table of a stereoplotting device having a vertically movable image platen and a meter connected thereto by a driving connection for registering the movement of the table according to the metric system, an attachment for changing the registration of the movement of the table to the English system, said attachment comprising a set of meter driving members inserted in said connection between said platen and said meter, said connection comprising a gear driven in accordance with the vertical movement of said platen, a meter-driving shaft driven from said gear and a meter shaft, said attachment comprising a train of rotatable driving members between said driving shaft and said meter shaft, one of the driving members being carried by the driving shaft and one of the driving members being carried by the meter shaft, means for supporting the meter on the table, said means comprising a bracket which supports the meter and its shaft with the driving member carried thereby, a bracket fixed to the table relative to the driving shaft and the driving member carried thereby, a pivotal connection between the two brackets to permit movement of the driving members into driving association, and resilient means comprising a spring tending to pivot the first bracket on the second bracket so as to hold the two driving members in driving engagement.

2. The combination of claim 1 wherein the driving members are removably carried on their respective shafts.

3. The combination of claim 2 wherein the force exerted by said spring is adjustable.

4. The combination of claim 3 wherein the gear is enclosed within a housing, said housing having a sleeve through which said driven shaft projects, said meter having a sleeve through which the meter shaft projects, said meter sleeve fitting said housing sleeve when it is desired to mount the meter directly thereon.

5. The combination of claim 4 wherein the housing is mounted on the table by means which permits repositioning at two positions 180° apart, said fixed bracket being clamped to the table beneath said housing.

References Cited in the file of this patent

UNITED STATES PATENTS

| | | |
|---|---|---|
| 1,634,565 | Wallbillich | July 5, 1927 |
| 1,909,923 | Von Bertrab | May 16, 1933 |
| 2,327,567 | Middleton | Aug. 24, 1943 |
| 2,363,643 | Cook | Nov. 28, 1944 |